United States Patent [19]

Schmidt et al.

[11] 4,304,516

[45] Dec. 8, 1981

[54] SOLID WASTE TRANSPORT

[75] Inventors: Howard A. Schmidt, Pompano Beach, Fla.; Ved P. Khatri, Chicago; Irving Handler, Calumet City, both of Ill.

[73] Assignee: Waste Management, Inc., Oakbrook, Ill.

[21] Appl. No.: 45,481

[22] Filed: Jun. 4, 1979

[51] Int. Cl.$^{3}$ .................. B60P 1/36

[52] U.S. Cl. .................. 414/328; 414/528; 198/841

[58] Field of Search .................. 414/327, 328, 292, 528, 414/289, 387; 198/841, 387; 222/41, 51

[56] References Cited

U.S. PATENT DOCUMENTS

| | | | |
|---|---|---|---|
| 1,395,701 | 11/1921 | Cain | 414/328 X |
| 1,915,756 | 6/1933 | Pierce | 414/528 |
| 3,603,450 | 9/1971 | Chamberlain et al. | 198/841 X |
| 3,618,824 | 11/1971 | Seymour | 222/51 |
| 3,643,785 | 2/1972 | Bostedt | 414/528 X |
| 3,857,502 | 12/1974 | Holland et al. | 222/41 X |
| 3,913,760 | 10/1975 | Koral | 414/528 |
| 3,937,338 | 2/1976 | Cox | 414/528 |
| 4,056,202 | 11/1977 | MacKenzie et al. | 414/327 X |
| 4,068,769 | 1/1978 | Sweet et al. | 414/528 X |
| 4,125,195 | 11/1978 | Sasadi | 414/328 X |
| 4,149,642 | 4/1979 | Schneider | 414/528 X |
| 4,160,621 | 7/1979 | Bishop | 414/528 X |

*Primary Examiner*—Charles A. Marmor
*Attorney, Agent, or Firm*—Sughrue, Mion, Zinn, Macpeak and Seas

[57] ABSTRACT

A solid waste disposal system employs solid waste transport trailers adapted to be towed by a tractor. The trailers each comprise a closed body of a generally rectangular cross-section having a bottom, side and top walls, a forward end wall and a rear end wall. The top wall proximal to the forward end wall is provided with a loading neck through which solid waste can be loaded. The rear end wall is a door hinged at the rear edge of the top wall and is adapted to be closed during the loading operation and transport of the solid waste and opened for the unloading of the solid waste. A conveyor is located adjacent the bottom wall of the trailer and extends substantially over the entire length of the bottom wall. The conveyor is operable during loading and unloading to move the solid waste in a direction from the forward end wall toward the rear end wall. The trailer is supported by ground wheels with tires, the wheels being low pressure flotation tires to facilitate the use of the trailer on landfill sites. To load the trailer, an elevated hopper is provided. The hopper is charged with solid waste by a conveyor system or the like. A chute is connected to the hopper and is provided with a movable slip flange at its free end for connecting it to the loading neck of the trailer to provide a sealed, one-point loading system.

1 Claim, 5 Drawing Figures

SOLID WASTE TRANSPORT

BACKGROUND OF THE INVENTION

The present invention generally relates to solid waste transport and disposal systems, and more particularly to a solid waste transport trailer and a loading system which provide a sealed, one-point loading system.

Solid waste disposal is a continuing problem requiring not only a sanitary but also an efficient and economical solution. Many municipalities use a landfill for the ultimate disposal of the solid waste. However, it is often uneconomical to have the collection vehicle haul the solid waste to the landfill. Instead, the collection vehicles are sent to a central collection point and unloaded. The solid waste is then loaded onboard larger transport vehicles for transporting the solid waste to the landfill. These transport vehicles are often open which can lead to an undesirable discharge of the solid waste while in transmit. Once the transport vehicle has arrived at the landfill, it is then necessary to unload the vehicle and evenly spread the solid waste in the landfill. The unloading operation is typically accomplished by means of a dumping mechanism operated by hydraulic cylinders, while the spreading operation is usually performed with a bulldozer or the like.

SUMMARY OF THE INVENTION

It is an object of the present invention to provide an improved solid waste disposal system which is more sanitary and yet more efficient and economical than solid waste disposal systems of the prior art. It is another object of the present invention to provide a solid waste transport trailer which features a sealed, one-point loading system.

It is yet another object of the present invention to provide a solid waste transport trailer which can be used to not only transport the solid waste to the landfill, but also to aid in evenly spreading the solid waste over the landfill.

The foregoing and other objects, aspects and advantages of the invention are accomplished by providing a solid waste transport trailer having a closed body of a generally rectangular cross-section having bottom, side and top walls, a forward end wall and a rear end wall. The top wall proximal to the forward end wall is provided with a loading neck through which solid waste can be loaded. The rear end wall is a door hinged at the rear edge of the top wall and adapted to be closed for loading and transport of the solid waste and opened for unloading of the solid waste. A conveyor is located adjacent the bottom wall and extends over substantially the entire length thereof. The conveyor is operable during loading and unloading to move the solid waste in the direction from the forward end wall toward the rear end wall. The trailer is provided with a hitch attached to the body near the forward end wall and adapted to be connected to a tractor for transporting the trailer. The trailer has at least one axle carrying wheels with tires attached to the body near the rear end wall.

The solid waste disposal system herein further includes an elevated hopper and means, such as a conveyor system, for charging the hopper with solid waste. A chute is connected to the hopper and has a moveable slip flange at the free end thereof for connecting it to the loading neck of the trailer to provide a sealed one-point loading system.

Other features of the invention include the use of low pressure flotation tires to facilitate the hauling of the trailer over the landfill for unloading. Further, there may be provided a vent in the top wall of the trailer proximal to the rear end wall to prevent a build up of air pressure from developing and to permit air to escape at a remote location whereby air borne particles are permitted to gravitate into the trailer thereby enhancing dust control.

BRIEF DESCRIPTION OF THE DRAWINGS

The novel features of the invention as well as its advantages over the prior art will be better understood from the following detailed description with reference to the accompanying drawings, in which.

DESCRIPTION OF THE PREFERRED EMBODIMENT

Figure 1:
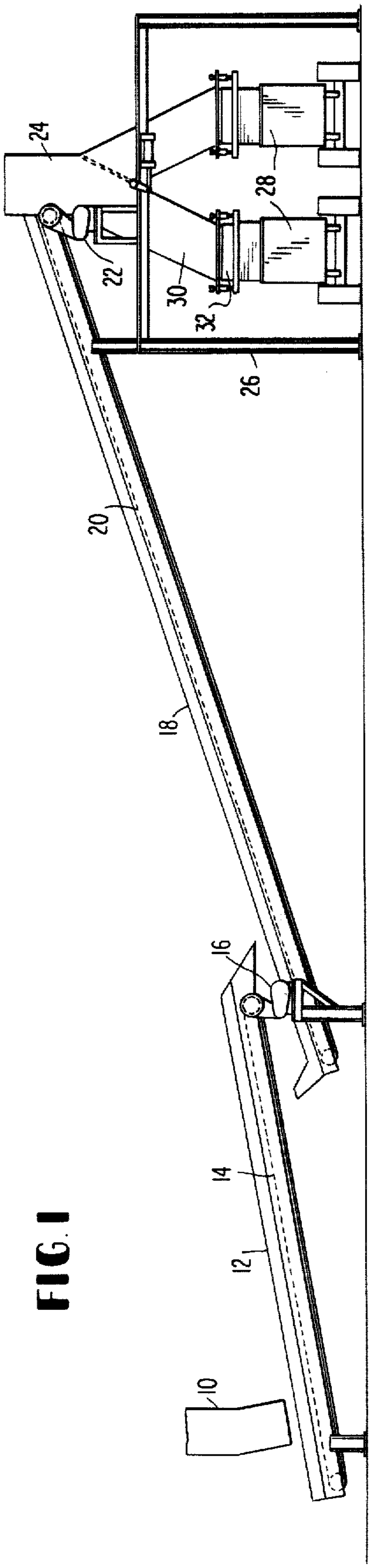
FIG. 1 is an elevation view showing a loading arrangement for solid waste transport trailers according to the invention.

Referring now to FIG. 1 of the drawings, there is illustrated a loading system for use at a central collection point. Collection vehicles may be brought into a dumping area (not shown) at some elevated point. The solid waste dumped by the collection vehicles is directed down a chute 10 onto a first conveyor 12. This conveyor is inclined approximately 10° to the horizontal and includes an endless belt 14 driven by a motor and pulley 16. The solid waste dropped at the lower end of conveyor 12 by chute 10 is moved upwardly and then dropped on a second conveyor 18. This conveyor comprises an endless belt 20 driven by a motor and pulley 22. Conveyor 18 is inclined approximately 18° to the horizontal and moves the solid waste dropped thereon by the conveyor 12 upwardly towards a hopper 24. The effect of this conveyor system comprising the conveyors 12 and 18 is to evenly distribute the solid waste dropped by chute 10 so that there is a fairly even and continuous movement of solid waste into the hopper 24.

Figure 2:
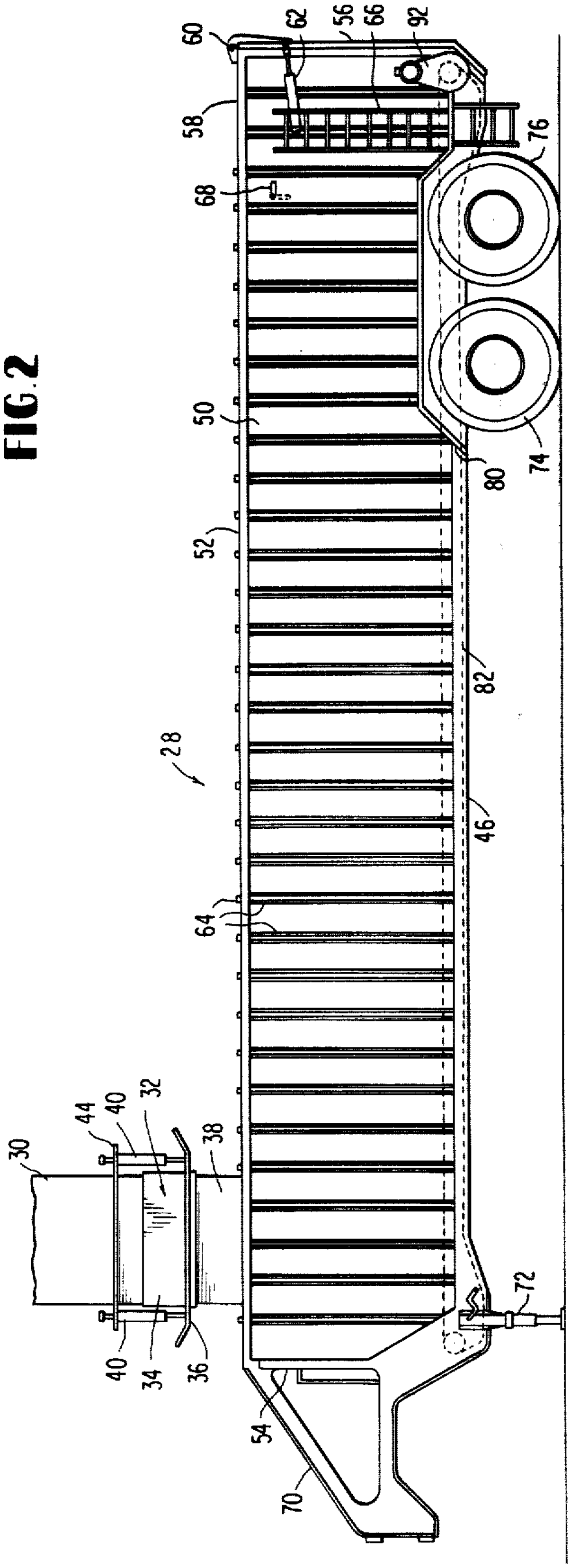
FIG. 2 is a side view of a solid waste transport trailer according to the invention.

As shown in FIG. 1, the hopper 24 is supported by a frame structure 26 in an elevated position above the ground level to permit the driving of one or more trailers 28 thereunder. The hopper 24 is provided with a chute 30 having a moveable slip flange 32 at the free end thereof for connecting to a loading neck on the trailer. As shown in FIG. 2, the slip flange 32 comprises a sleeve 34 and a flange 36 which meets with the loading neck 38 of the trailer 28. Attached to the four corners of the flange 36 are hydraulic cylinders 40 connected to a rigid top flange 44. These serve to raise and lower the slip flange 32. The top flange 44 is attached to the free bottom end of the chute 30. Thus, when the trailer is positioned under the chute 30, the flange 36 carrying the sleeve 34 can be brought downwardly to form a seal about the loading neck 38.

Figure 3:
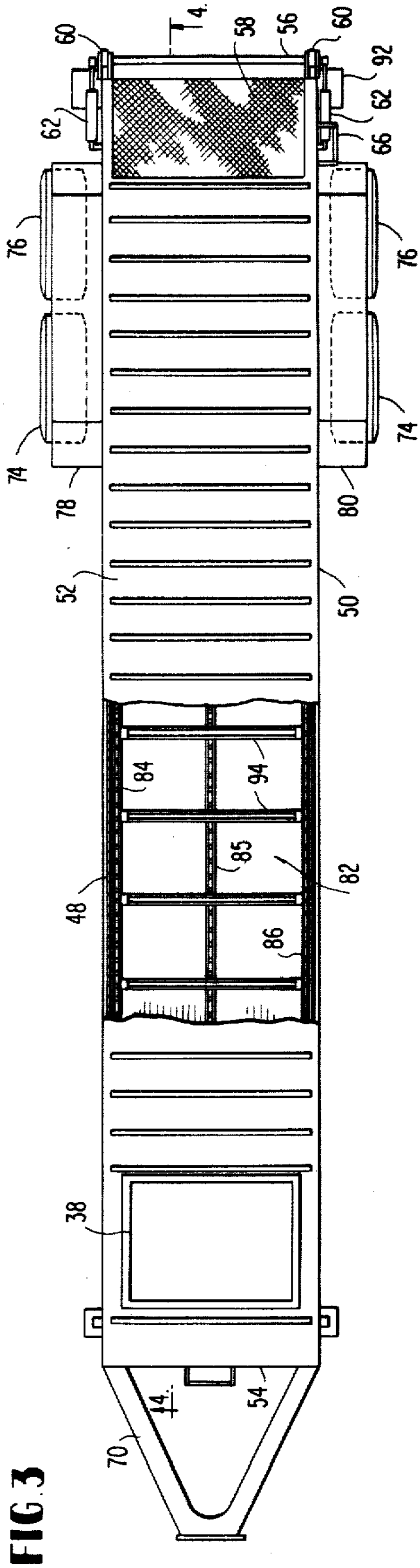
FIG. 3 is a top view of the trailer shown in FIG. 2 with the top wall partially broken away to expose the interior bottom wall and conveyor.

Referring now to FIGS. 2 and 3, the trailer 28 features a closed body of generally rectangular cross-section. The body has a bottom wall 46, side walls 48 and 50, and a top wall 52. The loading neck 38 is located in the top wall proximate the forward end wall 54 of the trailer. Also located in the top wall 52 but at the opposite end thereof near the rear end wall 56 is an expanded metal vent 58 which is provided for the purpose of preventing a build up of air pressure, and to aid in dust control. The rear end wall 56 is a power operated door hinged at the top along the rear edge of the top wall 52 by means of hinges 60. The door is opened and closed by means of hydraulic cylinders 62 mounted on the side walls 48 and 50. The door 56 is normally locked in the closed position during loading and transport of the trailer, but the door 56 is opened to permit unloading of the trailer as will become clear as the description progresses.

The trailer is preferably made of steel. More specifically, the bottom wall 46 may be made of 3/16" thick steel plate, while the side walls 48 and 50 and the top wall 52 may be made of a lighter 14 gauge steel skin supported and reinforced by ten gauge steel posts 64. Further, the trailer may be provided with a ladder 66 on one or both side walls 48 and 50 near the rear end wall 56 so as to provide access to the expanded metal vent 58. This ladder facilitates both inspection and repair. Also, on one or both side walls 48 and 50 near the upper edge toward the rear end wall 56 is a flag 68 which serves as a load indicator. The solid line position of the flag 68 shown in FIG. 2 indicates a full load, while the dotted line position of the flag 68 indicates substantially less than a full load. The flag may be operated by a paddle (not shown) attached to a transverse rod to which the flag 68 is fixedly attached at an outwardly extending end thereof. As the trailer is loaded, the solid waste begins to engage the paddle on the interior of the trailer body causing it to be deflected, and the deflection of the paddle is indicated by a like deflection of the flag 68.

At the forward end of the trailer, there is provided a hitch 70 for attachment to a tractor for transport of the trailer to the landfill and hauling the trailer over the landfill. Also at the forward end of the trailer, there is provided a telescopic-hinged landing gear 72 for supporting the trailer when not attached to the tractor as, for example, when the trailer is stored and not in use. At the opposite end of the trailer, there is provided at least one axle and preferably two, which carry wheels with tires. FIGS. 2 and 3 illustrate a two axle trailer wherein each axle is provided with a pair of rubber tired wheels 74 and 76. In the preferred embodiment of the invention, the tires are low pressure flotation tires which permit hauling over the landfill. Conventional tires do not lend themselves to this use because the ground of the landfill is typically quite spongy, and a heavily loaded trailer would quickly become bogged down. Mud guards 78 and 80 may be provided over the wheels 74 and 76 and attached to the side walls 48 and 50, respectively.

Solid waste which enters the trailer through the loading neck 38 falls to the floor of the trailer and is moved to the rear of the trailer by means of a conveyor 82. The conveyor 82 is indicated in dotted line in FIG. 2 and, as shown in more detail in FIGS. 3, 4 and 5, comprises a series of endless chains 84, 85 and 86, the chains 84 and 86 being located adjacent to side walls 48 and 50, respectively, and running above and below the bottom wall 46. The chains are trained about sprockets, including idler sprockets 88 and drive sprockets 90. The sprocket 88 located near the forward end wall 54 are free running sprockets, while the sprockets 90 located near the rear end wall 56 are driven sprockets. The drive to the sprockets 90 may be supplied by hydraulic motors 92, for example, attached to the outside of the trailer body. A plurality of elongated rigid members, such as channels 94, extend transversely across the bottom wall 46 and are attached at either end to the chains 84, 85 and 86. It is not necessary to use members having a channel cross-section as shown particularly in FIG. 4, but the elongated members should have at least one vertical flange to facilitate the movement of solid waste toward the rear of the trailer. Thus, member having an L-shaped cross-section could also be used to advantage.

The chain upper flights ride on wear strips 95 on the upper surface of the wall 46. The channels 94 have wear shoes 97 at the ends thereof, for a purpose appearing below.

Figure 4:
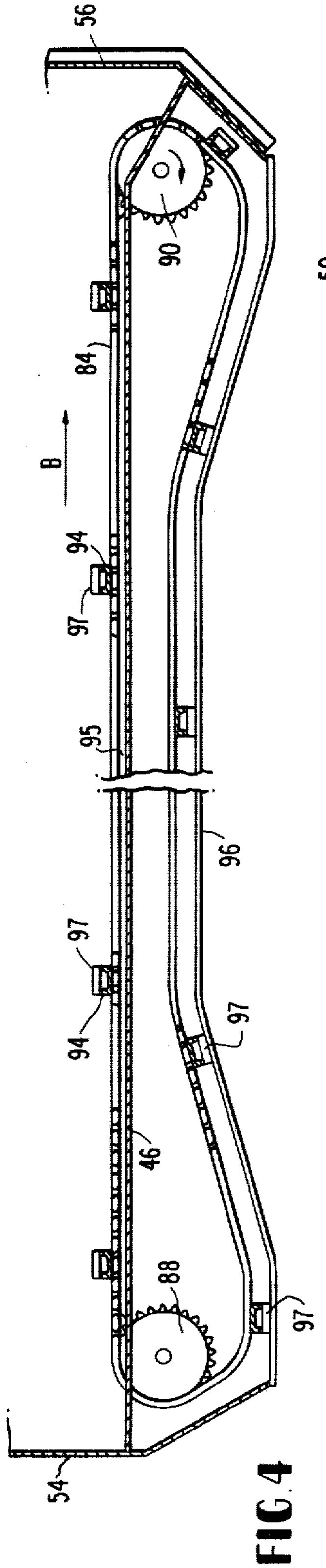
FIG. 4 is a fragmentary cross-sectional view taken along sectional line 4—4 in FIG. 3 and illustrating the details of the conveyor end of the bottom of the trailer.
Figure 5:
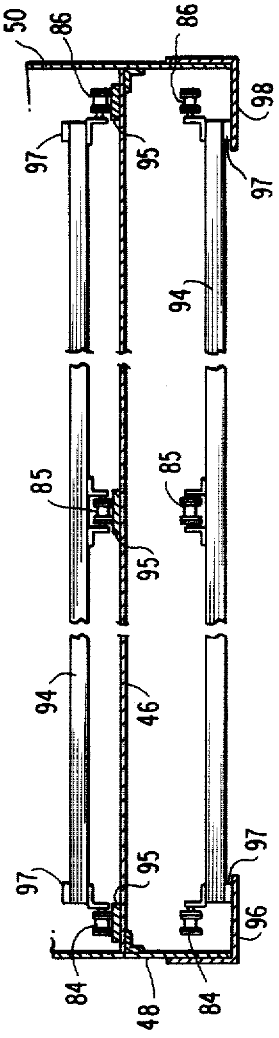
FIG. 5 is another fragmentary cross-sectional view transverse that of FIG. 4 also showing the details of the conveyors in the bottom of the trailer.

As shown in FIG. 4, the sprockets 90 are driven in a clockwise direction as indicated by arrow A so that the conveyor moves in the direction of arrow B from the forward end wall 54 toward the rear end wall 56 of the trailer. As a result, the chains 84, 85 and 86 are in tension above the bottom wall 46, but generally slack below the bottom wall. The side walls 48 and 50 project below the bottom wall 46 and are provided at their lower ends with inwardly projecting flange member 96 and 98 as shown in FIG. 5. The upper surfaces of these flange members 96 and 98 support the slack sections of the chains, the wear shoes 97 riding thereon. Preferably, these flange members 96 and 98 are relatively close to the bottom wall 46 of the trailer throughout most of its length but slope downwardly at either end in the vicinity of the sprockets 88 and 90 to form a guide way to pick up the chain as it leaves sprockets 90 and allow the chains to freely feed onto sprockets 88.

From the foregoing, it will be appreciated that the invention provides a very sanitary yet efficient and economical solid waste disposal system. The solid waste is loaded into the transport trailers in a sealed, one-point loading system. Loading of the trailers is facilitated by a conveyor in the bottom of the trailer which moves the solid waste dropped through the loading neck 38 toward the rear of the trailer. Once loaded, the trailer can be transported to the landfill without fear of unintentional discharge of solid waste because the trailer is closed. At the landfill, the trailer, because of its low pressure flotation tires can be hauled over the landfill to evenly distribute the solid waste. During this process, the rear door 56 is opened and the conveyor 82 is operated as the trailer is pulled along so that the solid waste is evenly discharged out the rear of the trailer. Alternatively, the material may be discharged from a stationary trailer and later spread with other landfill equipment.

We claim:

1. In a solid waste disposal system the improvement comprising:

at least one solid waste transport trailer including a closed body of generally rectangular cross-section having bottom, side and top walls, a forward end wall and a rear end wall, said side walls extending below said bottom wall and flanges thereon projecting inwardly beneath said bottom wall and sloping downwardly near either end of said bottom wall;

said top wall proximate to said forward end wall being provided with a single loading neck through which solid waste can be loaded and an expanded metal vent near said rear end wall to prevent pressure build-up within said trailer;

said rear end wall being a door hinged at the rear edge of said top wall and adapted to be closed for loading and transport of said solid waste and open for unloading of said solid waste;

a pair of hydraulic cylinders attached to said door and to said side walls for opening and closing the door;

a conveyor adjacent said bottom wall and extending over substantially the entire length thereof, said conveyor being operable during loading and unloading to move solid waste in the direction from said forward end wall toward said rear end wall;

said conveyor comprises a series of endless chains, at least two of which are located next to said side walls and running above and below said bottom wall;

a plurality of elongated rigid members having at least one vertical flange, said elongated rigid members extending transversely across said bottom wall and being attached to said series of endless chains;

said rigid members having wear shoes riding on the flanges projecting beneath the bottom wall, said bottom wall having an upper horizontal planer surface with a plurality of spaced apart, longitudinally extending wear strips and the endless chains adapted to ride on said wear strips;

a hitch attached to said closed body near said forward end wall and adapted to be connected to a tractor for transporting said trailer;

at least one axle bearing wheels with large diameter flotation tires, said axle attached to said body near said rear end wall, an elevated hopper supported above said solid waste transport trailer, means for charging said hopper with solid waste, and a chute connected to said hopper and having hydraulic means for raising and lowering a slip flange at the free end of said chute for connecting said slip flange to the loading neck of said trailer to provide a sealed, one-point loading system; and indicator flags on said side walls to indicate a full load condition.

* * * * *